United States Patent
Shin et al.

(10) Patent No.: US 8,926,940 B2
(45) Date of Patent: Jan. 6, 2015

(54) DEVICE AND METHOD FOR GENERATING HYDROGEN FROM AN AMMONIA BORANE-BASED COMPOUND HYDROGEN RESERVOIR, A CATALYST USED WITH THE SAME, AND A DEVICE FOR USING EMITTED HYDROGEN

(75) Inventors: Dong Yun Shin, Seoul (KR); Nok Jung Song, Seoul (KR); Sung Kwan Kim, Oksan-ri (KR)

(73) Assignee: Youl Chon Chemical Co. Ltd., Seoul (KR)

( * ) Notice: Subject to any disclaimer, the term of this patent is extended or adjusted under 35 U.S.C. 154(b) by 0 days.

(21) Appl. No.: 13/704,804

(22) PCT Filed: Jun. 16, 2010

(86) PCT No.: PCT/KR2010/003873
§ 371 (c)(1),
(2), (4) Date: Dec. 17, 2012

(87) PCT Pub. No.: WO2011/158979
PCT Pub. Date: Dec. 22, 2011

(65) Prior Publication Data
US 2013/0089493 A1     Apr. 11, 2013

(30) Foreign Application Priority Data

Jun. 15, 2010   (KR) .................. 10-2010-0056516

(51) Int. Cl.
*C01B 3/02*      (2006.01)
*C01B 3/04*      (2006.01)
*B01J 8/00*      (2006.01)
*C01B 3/06*      (2006.01)
*H01M 8/04*      (2006.01)
*H01M 8/06*      (2006.01)
*F17C 11/00*     (2006.01)

(52) U.S. Cl.
CPC . *C01B 3/04* (2013.01); *C01B 3/065* (2013.01); *H01M 8/04216* (2013.01); *H01M 8/065* (2013.01); *B01J 8/00* (2013.01); *C01B 3/02* (2013.01); *Y02E 60/50* (2013.01); *Y02E 60/362* (2013.01); *Y02E 60/364* (2013.01); *F17C 11/005* (2013.01); *Y02E 60/321* (2013.01)
USPC ........... 423/650; 423/648.1; 422/129; 556/20

(58) Field of Classification Search
None
See application file for complete search history.

(56) References Cited

U.S. PATENT DOCUMENTS 6,025,295 A *  2/2000  Tanielyan et al. ............. 502/154
8,518,368 B2 *  8/2013  Abdur-Rashid et al. ...... 423/657

(Continued)

FOREIGN PATENT DOCUMENTS

KR   1020100012716 A    2/2010
KR   1020100017878 A    2/2010

(Continued)

*Primary Examiner* — Melvin C Mayes
*Assistant Examiner* — Douglas Call
(74) *Attorney, Agent, or Firm* — Browdy and Neimark, PLLC

(57) ABSTRACT

Provided are: a device and method for generating hydrogen from a hydrogen reservoir, whereby it is possible to produce two weight equivalents of the weight equivalent of the hydrogen which can be emitted from ammonia borane-based compounds, in other words a hydrogen storage capacity of 13.0%, in a short time at low temperature; a catalyst used with the same; and a device for using emitted hydrogen.

2 Claims, 5 Drawing Sheets

(56) References Cited

U.S. PATENT DOCUMENTS

2007/0128475 A1* 6/2007 Blacquiere et al. ............ 429/13
2007/0172417 A1   7/2007 Zhang et al.
2010/0152494 A1* 6/2010 Schmidt-Leithoff et al. . 568/459

FOREIGN PATENT DOCUMENTS

| WO | 2008141439 A1 | 11/2008 | |
| WO | WO2008/132057 * | 11/2008 | ............ C07C 45/62 |
| WO | 2009124169 A1 | 10/2009 | |

* cited by examiner

DEVICE AND METHOD FOR GENERATING HYDROGEN FROM AN AMMONIA BORANE-BASED COMPOUND HYDROGEN RESERVOIR, A CATALYST USED WITH THE SAME, AND A DEVICE FOR USING EMITTED HYDROGEN

TECHNICAL FIELD

The present disclosure relates to an apparatus and a method for generating hydrogen from an ammonia borane-based compound as a hydrogen reservoir, a catalyst used for same and an apparatus for using the generated hydrogen.

BACKGROUND ART

Needs on new renewable alternative energy are increasing with the depletion of fossil energy and environmental pollution, and hydrogen is drawing attentions as one of such energy.

Fuel cells and hydrogen combustion devices use hydrogen as reactive gas. To utilize the fuel cells and hydrogen combustion devices, for example, in automobiles or electronic products, stable and consistent supply and storage of hydrogen are necessary.

In order to supply hydrogen to an apparatus using hydrogen, hydrogen may be supplied from a separately equipped hydrogen tank when necessary. For this purpose, compressed hydrogen or liquefied hydrogen may be used to store hydrogen.

Alternatively, after loading materials storing and generating hydrogen in the apparatus using hydrogen, hydrogen may be generated from reaction of the materials and then supplied to the apparatus using hydrogen. As for the materials for the method, for example, metal hydride, adsorption on carbon, chemical hydrogen storage, or the like have been suggested.

DISCLOSURE

Technical Problem

Ammonia borane (AB; $NH_3BH_3$) has the highest hydrogen storage capacity among the currently known materials. It has a hydrogen storage capacity of 3 equivalents, i.e. 19.6%. To fully utilize the hydrogen storage capacity of 19.6%, the 3 equivalents of hydrogen should be released over long period of time at high temperatures of 100° C., 150° C. and 1400° C., for each equivalent of hydrogen. Such a hydrogen releasing operated at high temperatures for long time may be a big obstacle to the application of the hydrogen reservoir to an apparatus using hydrogen.

The present disclosure is directed to providing an apparatus for generating hydrogen from an ammonia borane-based compound as a hydrogen reservoir, capable of releasing 2 equivalents of hydrogen, i.e. 13% of hydrogen storage capacity, from the hydrogen reservoir, a catalyst used for same and an apparatus for using the released hydrogen.

Technical Solution

In an aspect, the present disclosure provides a method for generating hydrogen from a hydrogen reservoir, comprising releasing 2 equivalents of hydrogen from a total of 3 equivalents of hydrogen from an ammonia borane or an ammonia borane derivative, which is a hydrogen reservoir, by providing a first catalyst to the ammonia borane or the ammonia borane derivative.

In another aspect, the present disclosure provides an apparatus for generating hydrogen including a hydrogen generating reactor releasing 2 equivalents of hydrogen from a total of 3 equivalents of hydrogen from an ammonia borane or an ammonia borane derivative, which is a hydrogen reservoir, by dehydrogenating the ammonia borane or the ammonia borane derivative in the presence of a first catalyst.

In an exemplary embodiment, a complex catalyst represented by Chemical Formula 1 is used as the first catalyst.

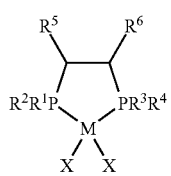

[Chemical Formula 1]

In Chemical Formula 1, M is a central metal of the complex. M may be all known metals; $R^1$, $R^2$, $R^3$ and $R^4$ are independently hydrogen, hydrocarbyl, substituted hydrocarbyl, heterohydrocarbyl or substituted heterohydrocarbyl; $R^5$ and $R^6$ are independently hydrocarbyl excluding hydrogen or substituted hydrocarbyl excluding hydrogen; and X's attached to M are the same or different from each other and are independently selected or selected at least two at the same time from a group consisting of a halogen atom, a $C_1$-$C_{20}$ alkyl group, a $C_7$-$C_{30}$ arylalkyl group, an alkoxy group having a $C_1$-$C_{20}$ alkyl group, a $C_3$-$C_{20}$ alkyl-substituted siloxy group and an amido group having a $C_1$-$C_{20}$ hydrocarbon group.

In another aspect, the present disclosure provides an apparatus using hydrogen, including the apparatus for generating hydrogen.

Advantageous Effects

From an ammonia borane-based compound, which is a representative hydrogen reservoir, 2 equivalents of hydrogen, i.e. 13% of the total hydrogen storage capacity, can be released (discharged) at low temperature, e.g. room temperature (25° C.), in a short time, e.g. within 1 minute.

MODE FOR THE INVENTION

Figure 1:
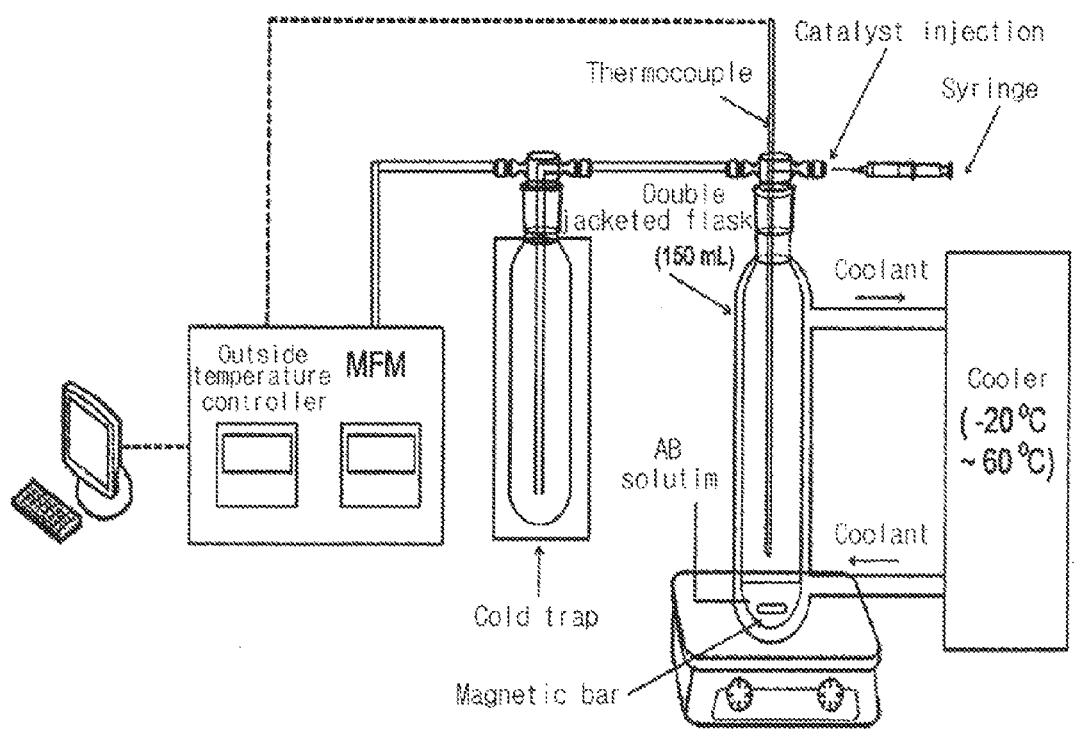
FIG. 1 schematically illustrates an apparatus for generating hydrogen according to an exemplary embodiment of the present invention.

Hereinafter, the embodiments of the present invention will be described in detail.

In the context, a hydrogen reservoir refers to a compound capable of generating hydrogen through a chemical reaction.

In the context, an ammonia borane-based compound refers to ammonia borane or a derivative thereof.

In the context, an apparatus using hydrogen includes an apparatus which receives hydrogen and combusts hydrogen or produces electricity or an apparatus powered by such an electricity-producing apparatus.

In exemplary embodiments, 2 equivalents of hydrogen may be released from an ammonia borane-based compound, i.e. ammonia borane or an ammonia borane derivative (a derivative having one or more substituent at amine or borane of ammonia borane) as a hydrogen reservoir using a catalyst described below at low temperature, e.g. room temperature.

To describe in detail, 2 equivalents of hydrogen (corresponding to 13% of hydrogen storage capacity) can be released from ammonia borane or an ammonia borane derivative using a homogeneous, first catalyst. That is to say, 2 equivalents of hydrogen can be released at low temperature, e.g. room temperature, using the first catalyst. This means that 13% of hydrogen stored in ammonia borane or a derivative thereof can be released at low temperature, e.g. room temperature. As a result of the reaction, polyiminoborane may be produced from ammonia borane or its derivative (see Scheme 1).

[Scheme 1]

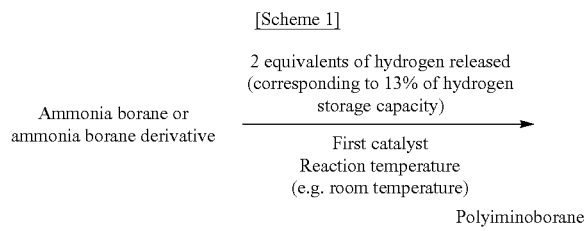

In an exemplary embodiment, not only ammonia borane ($NH_3BH_3$) but also an ammonia borane derivative having one or more substituent at amine or borane of ammonia borane may be used.

As for non-limiting examples, ammonia borane derivatives represented by Chemical Formulas 2-4 may be used.

 [Chemical Formula 2]

 [Chemical Formula 3]

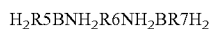 [Chemical Formula 4]

In the above chemical formulas, R1, R2, R3, R4, R5, R6 and R7 are independently a hydrogen atom, a halogen atom, a $C_1$-$C_{20}$ linear or branched alkyl group optionally substituted (i.e., substituted or unsubstituted) with one or more halogen atom, a silyl group having a $C_1$-$C_{20}$ linear or branched alkyl group optionally substituted with one or more halogen atom, a $C_6$-$C_{30}$ aryl group optionally substituted with one or more halogen atom, a $C_7$-$C_{31}$ aralkyl group optionally substituted with one or more halogen atom, an alkoxy group having a $C_1$-$C_{20}$ alkyl group optionally substituted with one or more halogen atom, a $C_3$-$C_{20}$ alkyl group or a $C_6$-$C_{20}$ aryl-substituted siloxy group, and these substituents may be optionally connected to form a ring.

In an exemplary embodiment, the first catalyst (see Chemical Formula 1 below) is a homogeneous catalyst. The homogeneous catalyst is a complex wherein a central metal is bound to one or more ligand stabilizing the central metal. The central metal may be any known metal.

Non-limiting examples of the metal include: an alkali metal such as Li, Na, K, Rb, Cs and Fr; an alkaline earth metal such as Be, Mg, Ca, Sr, Ba and Ra; a p-block metal in the periodic table such as Al, Ga, In, Sn, Tl, Ph and Bi; a b-block metal in the periodic table such as Sc, Ti, V, Cr, Mn, Fe, Co, Ni, Cu, Zn, Y, Zr, Nb, Mo, Tc, Ru, Pd, Ag, Cd, Hf, Ta, W, Re, Os, Ir, Pt, Au and Hg; a lanthanide such as La, Ce, Pr, Nd, Pm, Sm, Eu, Gd, Tb, Dy, Ho, Er, Tm and Yb; and an actinide such as Ac, Th, Pa, U, Np, Pu and Am. Specifically, a transition metal may be used. More specifically, Co, Ni, Pd or Pt may be used.

The first catalyst may be a complex catalyst represented by Chemical Formula 1.

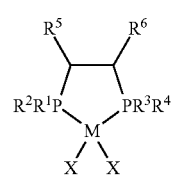 [Chemical Formula 1]

In Chemical Formula 1, M is the central metal of the complex and may be any known metal. $R^1$, $R^2$, $R^3$ and $R^4$ are independently hydrogen, hydrocarbyl, substituted hydrocarbyl, heterohydrocarbyl or substituted heterohydrocarbyl, and $R^5$ and $R^6$ are independently hydrocarbyl or substituted hydrocarbyl excluding hydrogen. X's attached to M are the same or different from each other and are independently selected or selected at least two at the same time from a group consisting of a halogen atom, a $C_1$-$C_{20}$ alkyl group, a $C_7$-$C_{30}$ arylalkyl group, an alkoxy group having a $C_1$-$C_{20}$ alkyl group, a $C_3$-$C_{20}$ alkyl-substituted siloxy group and an amido group having a $C_1$-$C_{20}$ hydrocarbon group.

The ligand that may form the complex with the central metal may be represented by Chemical Formula 5 and its backbone structure may be represented, for example, by Chemical Formulas 6-8.

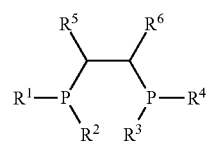 [Chemical Formula 5]

Chemical Formula 6 represents an (S,S)-enantiomer [(S,S)—$R^1R^2PCH(R^5)CH(R^6)PR^3R^4$], Chemical Formula 7 represents an (R,R)-enantiomer [(R,R)—$R^1R^2PCH(R)CH(R^6)PR^3R^4$] and Chemical Formula 8 represents a meso diastereomer [meso-$R^1R^2PCH(R^5)CH(R^6)PR^3R^4$].

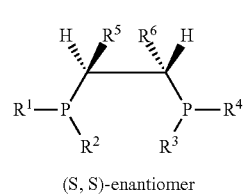 [Chemical Formula 6]

(S, S)-enantiomer

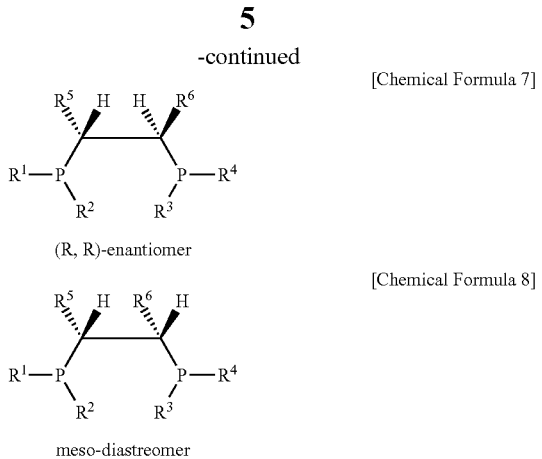

(R, R)-enantiomer meso-diastreomer

In the above chemical formulas, $R^1$, $R^2$, $R^3$ and $R^4$ are independently hydrocarbyl, substituted hydrocarbyl, heterohydrocarbyl or substituted heterohydrocarbyl, and $R^5$ and $R^6$ are independently hydrocarbyl excluding hydrogen or substituted hydrocarbyl excluding hydrogen.

Specifically, $R^1$, $R^2$, $R^3$ and $R^4$ may be independently selected from a group consisting of phenyl, benzyl, naphthyl, anthracenyl, mesityl, xylenyl, methyl, ethyl, ethylenyl, propyl, propenyl, propynyl, butyl, cyclohexyl, 4-methylcyclohexyl, 4-ethylcyclohexyl, 4-isopropylcyclohexyl, tolyl, xylyl, 4-methylphenyl, 4-ethylphenyl, 4-isopropylphenyl, 4-t-butylphenyl, 4-methoxyphenyl, 4-isopropoxyphenyl, cumyl, methoxy, ethoxy, phenoxy, tolyloxy, dimethylamino, thiomethyl, trimethylsilyl, dimethylhydrazyl, 2-methylcyclohexyl, 2-ethylcyclohexyl, 2-isopropylcyclohexyl, o-methylphenyl, o-ethylphenyl, o-isopropylphenyl, o-t-butylphenyl, o-methoxyphenyl, o-isopropoxyphenyl, biphenyl, naphthyl and anthracenyl.

More specifically, $R^1$, $R^2$, $R^3$ and $R^4$ may be independently selected from a group consisting of independently phenyl, tolyl, biphenyl, naphthyl, cyclohexyl, 4-methylphenyl, 4-ethylphenyl, 4-isopropylphenyl, 4-t-butylphenyl, 4-methoxyphenyl, 4-isopropoxyphenyl, 2-methylcyclohexyl, 2-ethylcyclohexyl, 2-isopropylcyclohexyl, o-methylphenyl, o-ethylphenyl, o-isopropylphenyl, o-t-butylphenyl, o-methoxyphenyl and o-isopropoxyphenyl.

$R^5$ and $R^6$ are independently hydrocarbyl excluding hydrogen or substituted hydrocarbyl excluding hydrogen. Specifically, $R^5$ and $R^6$ may be independently selected from a group consisting of alkyl, aryloxy, halogen, nitro, alkoxycarbonyl, carbonyloxy, alkoxy, aminocarbonyl, carbonylamino, dialkylamino, derivatives thereof and aryl substituted with any arbitary substituent.

For stably maintaining reaction activity, the ligand having the P—C—C—P backbone structure may have a configuration of (S,S)— or (R,R)—$(R_1)(R_2)$P—$(R_5)$CHCH$(R_6)$—P$(R_3)(R_4)$ or a mixture thereof.

Examples of the steroisomeric ligand having the P—C—C—P backbone structure for stably maintaining reaction activity include (S,S)— or (R,R)-(phenyl)$_2$P—CH(methyl)CH(methyl)-P (Phenyl)$_2$, (S,S)— or (R,R)-(4-methoxyphenyl)$_2$P—CH(methyl)CH(methyl)-P(4-methoxyphenyl)$_2$, (S,S)— or (R,R)-(4-methylphenyl)$_2$P—CH(methyl)CH(methyl)-P(4-methylphenyl)$_2$, (S,S)— or (R,R)-(4-ethylphenyl)$_2$P—CH(methyl)CH(methyl)-P(phenyl)$_2$, (S,S)— or (R,R)-(4-methoxyphenyl)$_2$P—CH(ethyl)CH(methyl)-P(4-ethylphenyl)$_2$, (S,S)— or (R,R)-(4-methoxyphenyl)$_2$P—CH(ethyl)CH(methyl)-P(phenyl)$_2$, (S,S)— or (R,R)-(4-ethylphenyl)$_2$P—CH(ethyl)CH(ethyl)-P(4-ethylphenyl)$_2$, (S,S)— or (R,R)-(phenyl)$_2$P—CH(ethyl)CH(ethyl)-P(phenyl)$_2$, (S,S)— or (R,R)-(phenyl)$_2$P—CH(isopropyl)CH(methyl)-P(phenyl)$_2$, (S,S)— or (R,R)-(4-methoxyphenyl)$_2$P—CH(isopropyl)CH(methyl)-P(4-methoxyphenyl)$_2$, (S,S)— or (R,R)-(4-ethylphenyl)$_2$P—CH(isopropyl)CH(methyl)-P(4-ethylphenyl)$_2$, (S,S)— or (R,R)-(phenyl)$_2$P—CH(n-propyl)CH(methyl)-P(phenyl)$_2$, (S,S)— or (R,R)-(4-methoxyphenyl)$_2$P—CH(n-propyl)CH(methyl)-P(4-methoxyphenyl)$_2$, (S,S)— or (R,R)-(4-ethylphenyl)$_2$P—CH(n-propyl)CH(methyl)-P(4-ethylphenyl)$_2$, (S,S)— or (R,R)-(phenyl)$_2$P—CH(isopropyl)CH(ethyl)-P(phenyl)$_2$, (S,S)— or (R,R)-(4-methoxyphenyl)$_2$P—CH(isopropyl)CH(ethyl)-P(4-methoxyphenyl)$_2$, (S,S)— or (R,R)-(4-ethylphenyl)$_2$P—CH(isopropyl)CH(ethyl)-P(4-ethylphenyl)$_2$, (S,S)— or (R,R)-1,2-di-(P(phenyl)$_2$)cyclohexane, (S,S)— or (R,R)-1,2-di-(P(4-methoxyphenyl)$_2$)cyclohexane (S,S)— or (R,R)-1,2-di-(P(4-ethylphenyl)$_2$)cyclohexane, (S,S)— or (R,R)-1,2-di-(P(phenyl)$_2$)cyclopentane, (S,S)— or (R,R)-1,2-di-(P(4-methoxyphenyl)$_2$)cyclopentane, (S,S)— or (R,R)-1,2-di-(P(4-ethylphenyl)$_2$)cyclopentane, (S,S)— or (R,R)-3,4-di-(P(phenyl)$_2$)pyrrole, (S,S)— or (R,R)-3,4-di-(P(4-methoxyphenyl)$_2$)pyrrole, (S,S)— or (R,R)-3,4-di-(P(4-ethylphenyl)$_2$)pyrrole, (S,S)— or (R,R)-3,4-di-(P(4-ethylphenyl)$_2$)imidazole, (S,S)— or (R,R)-(4-ethylphenyl)$_2$P—CH(dimethylamine)CH(dimethylamine)-P(4-ethylphenyl)$_2$, (S,S)— or (R,R)-(3-methoxyphenyl)$_2$P—CH(methyl)CH(methyl)-P(3-methoxyphenyl)$_2$, (S,S)— or (R,R)-(4-ethoxyphenyl)$_2$P—CH(methyl)CH(methyl)-P(o-ethoxyphenyl)$_2$, ((S,S)— or (R,R)-4-dimethylaminephenyl)$_2$P—CH(methyl)CH(methyl)P(4-dimethylaminephenyl)$_2$, (S,S)— or (R,R)-(4-ethylcyclohexyl)$_2$PCH(methyl)CH(methyl)P(4-ethylcyclohexyl)$_2$ (S,S)— or (R,R)-(2-ethylphenyl)$_2$ PCH(methyl)CH(methyl)P(2-ethylphenyl)$_2$, (S,S)— or (R,R)-(2-isopropylphenyl)$_2$PCH(methyl)CH(methyl)P(2-isopropylphenyl)$_2$, (S,S)— or (R,R)-(2-methylphenyl)$_2$PCH(methyl)CH(methyl)P(2-methylphenyl)$_2$, (S,S)— or (R,R)-(2-ethylphenyl)$_2$PCH(methyl)CH(methyl)P(phenyl)$_2$, (S,S)— or (R,R)-(2-ethylphenyl)$_2$PCH(ethyl)CH(methyl)P(2-ethylphenyl)$_2$, (S,S)— or (R,R)-(2-ethylphenyl)$_2$PCH(ethyl)CH(ethyl)P(2-ethylphenyl)$_2$, (S,S)— or (R,R)-(2-ethylphenyl)$_2$PCH(isopropyl)CH(methyl)P(2-ethylphenyl)$_2$, (S,S)— or (R,R)-(2-ethylphenyl)$_2$PCH(n-propyl)CH(methyl)P(2-ethylphenyl)$_2$, (S,S)— or (R,R)-(2-ethylphenyl)$_2$PCH(isopropyl)CH(ethyl)P(2-ethylphenyl)$_2$, 1,2-di-(P(2-ethylphenyl)$_2$)cyclohexane, (S,S)— or (R,R)-1,2-di-(P(2-ethylphenyl)$_2$)cyclopentane, (S,S)— or (R,R)-3,4-di-(P(2-ethylphenyl)$_2$)pyrrole, (S,S)— or (R,R)-3,4-di-(P(2-ethylphenyl)$_2$)imidazole, (S,S)— or (R,R)-(2-ethylphenyl)$_2$ PCH(dimethylamine)CH(dimethylamine)P(2-ethylphenyl)$_2$, (S,S)— or (R,R)-(2-methoxyphenyl)$_2$PCH(methyl)CH(methyl)P(2-methoxyphenyl)$_2$, (S,S)— or (R,R)-(2-ethoxyphenyl)$_2$PCH(ethyl)CH(methyl)P(2-ethoxyphenyl)$_2$, (S,S)— or (R,R)-(2-dimethylaminephenyl)$_2$PCH(methyl)CH(methyl)P(2-dimethylaminephenyl)$_2$ and (S,S)— or (R,R)-(2-ethylcyclohexyl)$_2$PCH(methyl)CH(methyl)P(2-ethylcyclohexyl)$_2$ but are not limited thereto.

In an exemplary embodiment, the steroisomeric P—C—C—P backbone structure of the ligand is different from that of the previously known)$(R)_n$PN(R')P$(R)_m$ hetero ligand since phosphorus (P) is the only heteroatom in the backbone structure.

That is to say, the ligand used in the first catalyst has a carbon-carbon backbone structure and lacks a nitrogen atom between two phosphorus atoms. By adequately controlling the spatial configuration using the substituents attached to the carbon atoms, superior catalytic activity can be achieved and reaction activity can be maintained stably.

In an exemplary embodiment, X may be, for example, Cl and M may be specifically Co, Ni, Pd or Pt. In the present disclosure, these compounds are named as KH14, KH15, KH16 and KH17, respectively. Their chemical structures are as follows.

[Chemical Formula 9]

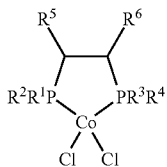

KH14 [e.g., bis(2,3-diphenylphosphinobutane) dichlorocobalt(II)]

[Chemical Formula 10]

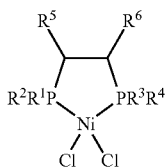

KH15 [e.g., bis(2,3-diphenylphosphinobutane) dichloronickel]

[Chemical Formula 11]

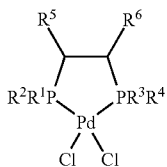

KH16 [e.g., bis(2,3-diphenylphosphinobutane) dichloropalladium]

[Chemical Formula 12]

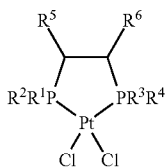

KH17 [e.g., bis(2,3-diphenylphosphinobutane) dichloraplatinum]

The catalyst may be prepared, for example, as follows. A solution of (S,S)-(phenyl)$_2$PCH(methyl)CH(methyl)P(phenyl)$_2$ in anhydrous ethanol is slowly added dropwise to a solution of M (central metal, e.g. cobalt(II)) chloride in anhydrous ethanol under nitrogen atmosphere. When the color of the solution changes, the solution is refluxed at a predetermined temperature for a predetermined time. After cooling to room temperature followed by filtering, the catalyst may be obtained by drying the ethanol solution.

In addition to the homogeneous catalyst described above, a heterogeneous catalyst may also be used. The heterogeneous catalyst may be prepared using the homogeneous catalyst.

As for a non-limiting example, the homogeneous catalyst may be reduced to form a metal cluster. The metal cluster may be a nanocluster and may have a size of, for example, 2 nm or smaller.

As described above, the method for generating hydrogen according to an exemplary embodiment comprises releasing 2 equivalents of hydrogen from a total of 3 equivalents of hydrogen from ammonia borane or the ammonia borane derivative which is a hydrogen reservoir by providing the first catalyst to the hydrogen reservoir.

In an exemplary embodiment, an apparatus for generating hydrogen comprises a hydrogen generating reactor releasing 2 equivalents of hydrogen from a total of 3 equivalents of hydrogen from ammonia borane or an ammonia borane derivative which is a hydrogen reservoir.

The ammonia borane or the ammonia borane derivative which is the hydrogen reservoir may be provided together with a solvent for dehydrogenation. Non-limiting examples of the solvent include: a hydrocarbon-based solvent such as n-pentane, n-hexane, n-heptane, n-octane, decane, dodecane, cyclohexane, cyclooctane, styrene, dicyclopentane, benzene, toluene, xylene, cumene, durene, indene, tetrahydronaphthalene, decahydronaphthalene, squalene, etc.; an ether-based solvent such as diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, tetrahydropyran, 1,2-dimethoxyethane, bis(2-methoxyethyl)ether, p-dioxane, tetrahydrofuran, etc.; and a polar solvent such as propylene carbonate, N-methyl-2-pyrrolidone, dimethylformamide, acetonitrile, dimethyl sulfoxide, methylene chloride, chloroform, etc. Specifically, use of the ether-based solvent among them may be preferred in terms of solubility and catalytic stability. These solvents may be used alone or in combination of two or more.

FIG. 1 schematically illustrates an apparatus for generating hydrogen according to an exemplary embodiment.

The hydrogen generating reactor is a 50-mL double jacketed glass reactor. The top of the reactor is connected with a 3-legged connector such that inflow of argon gas and flow of generated hydrogen toward a mass flow meter (MFM; a device for measuring gas flow; connected with a computer and allows real-time monitoring) can occur freely. This apparatus for generating hydrogen is configured such that reaction can occur without inflow of air from outside. The reaction temperature can be monitored with a thermocouple (connected with and controlled by a computer) equipped in the reactor and is maintained and controlled by a temperature controller provided outside the reactor.

A procedure of generating and measuring hydrogen using the apparatus will be described briefly. First, argon gas is flown into the reactor for 30 minutes to minimize inflow of oxygen and water into the reactor. While argon is flown into the reactor, an ammonia borane (AB) solution is injected through a catalyst inlet.

While the ammonia borane solution is stirred in the reactor, an argon inlet of the 3-legged connector is closed and the zero-point of the MFM is set in the state where the MFM is connected to the reactor.

Then, a first catalyst solution is injected through the catalyst inlet using a syringe. Hydrogen is generated simultaneously with the injection. The gas generation amount is monitored in real time using a monitor connected to the MFM and recorded automatically. A cold trap provided between the reactor and the MFM is maintained at −78° C. using dry ice-acetone slurry and traps the solvent or ammonia gas other than hydrogen.

The hydrogen generated by the method for generating hydrogen using the apparatus for generating hydrogen described above may be used in an apparatus using hydrogen. The apparatus using hydrogen comprises an apparatus which receives hydrogen and combusts it or produces electricity or an apparatus powered by such an electricity-producing apparatus.

As a non-limiting example, the apparatus using hydrogen may be a fuel cell. Specifically, the fuel cell may be a polymer electrolyte membrane fuel cell. Also, the apparatus using hydrogen may be an automobile powered by the fuel cell or an electronic product requiring a (especially, mobile) power supply such as a mobile phone, a notebook computer, a robot, etc.

Hereinafter, the exemplary embodiments will be described in detail through non-limiting examples.

Catalyst Preparation Example

Preparation of KH14 Catalyst

An example of the KH14 catalyst of Chemical Formula 9 described above was prepared as follows.

A solution of (S,S)-(phenyl)$_2$PCH(methyl)CH(methyl)P(phenyl)$_2$ (5.00 g, 12.5 mmol) in anhydrous ethanol (50 mL) was slowly added dropwise to a solution of cobalt(II) chloride (1.62 g, 12.5 mmol) in anhydrous ethanol (25 mL) under nitrogen atmosphere. The color of the solution changed from deep blue to green. The solution was refluxed at 80° C. for 3 hours. After cooling to room temperature and filtering, the ethanol solution was dried. Yield was 91% and IR (KBr) data were as follows: 3049 (m), 2926 (w), 1484 (m), 1435 (s), 1312 (w), 1190 (w), 1098 (s), 1027 (w), 999 (m), 878 (w), 816 (w), 742 (s), 696 (s), 529 (s), 514 cm$^{-1}$ (m).

[Dehydrogenation of Ammonia Borane Using KH14 Catalyst]

As shown in FIG. 1, ammonia borane (1.46 mmol) was added to a 50-mL three-necked flask. After injecting a tetrahydrofuran solvent (2 mL) into the flask, ammonia borane was dissolved by stirring. The catalyst prepared above (3 mol %) was dissolved in a nitromethane solvent (0.5 mL). As soon as the catalyst was added dropwise to the ammonia borane solution in the flask, hydrogen (70 mL, 2 equivalents) was generated at room temperature.

Figure 2:
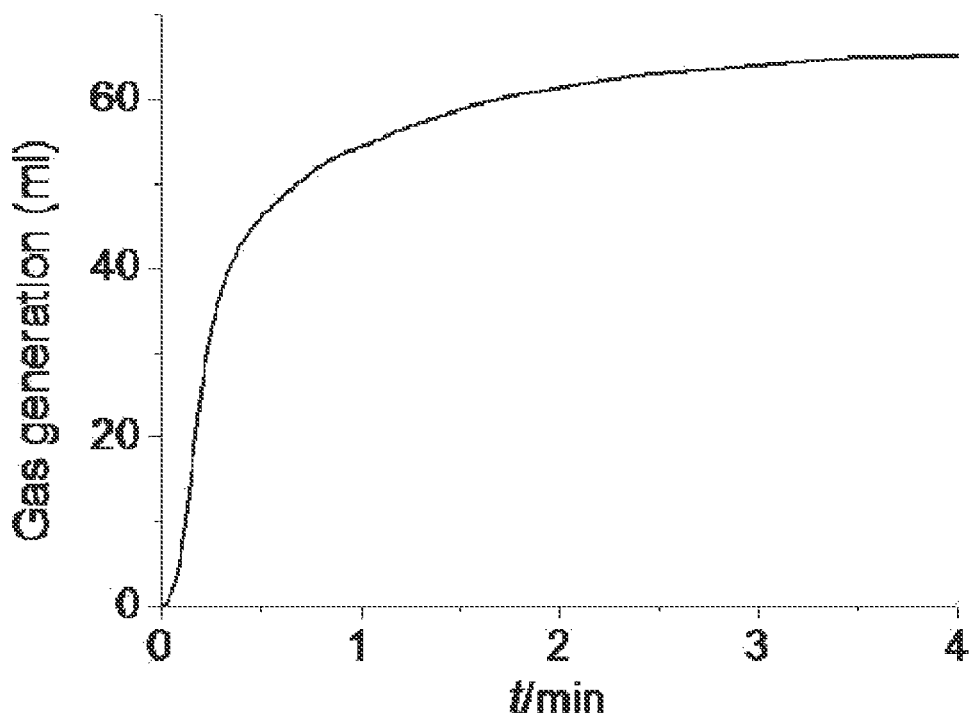
FIG. 2 shows a result of measuring hydrogen generation in an example of the present invention.
Figure 3:
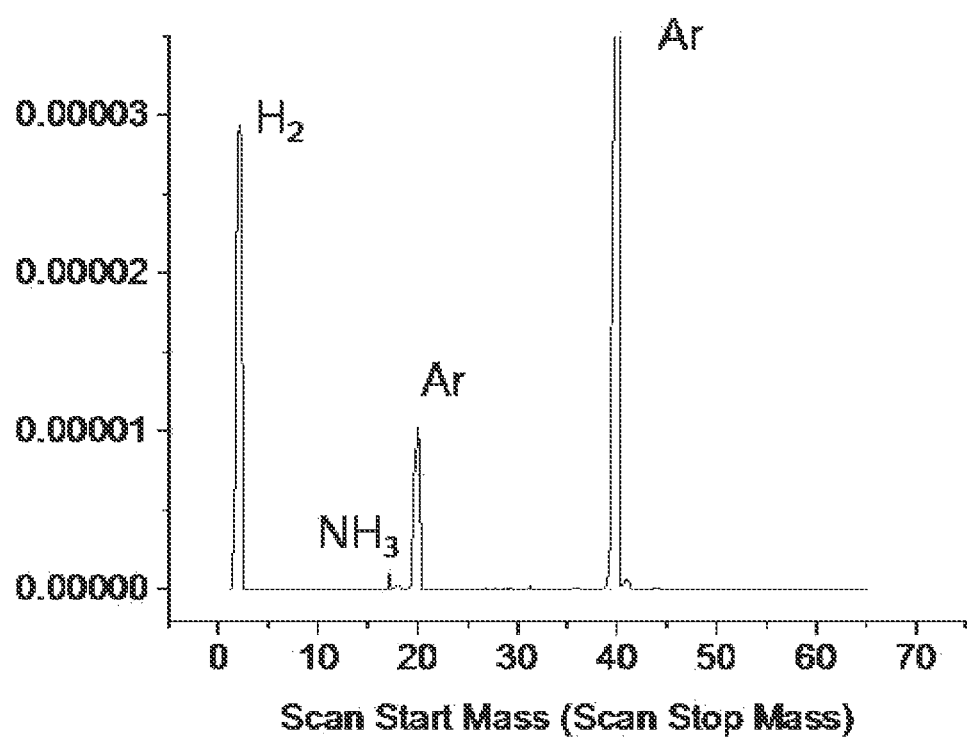
FIG. 3 shows a result of quadrupole mass analysis of a generated gas in an example of the present invention.
Figure 4:
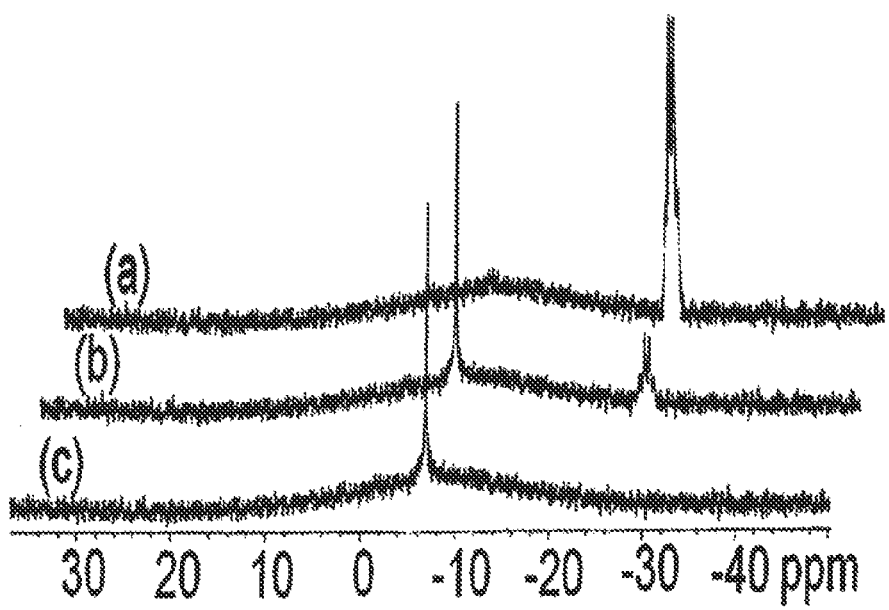
FIG. 4 shows a result of measuring $^{11}$B-NMR peaks in an example of the present invention. (a): before injection of the catalyst, (b): 30 seconds after the catalyst injection, (c): after completion of reaction.
Figure 5:
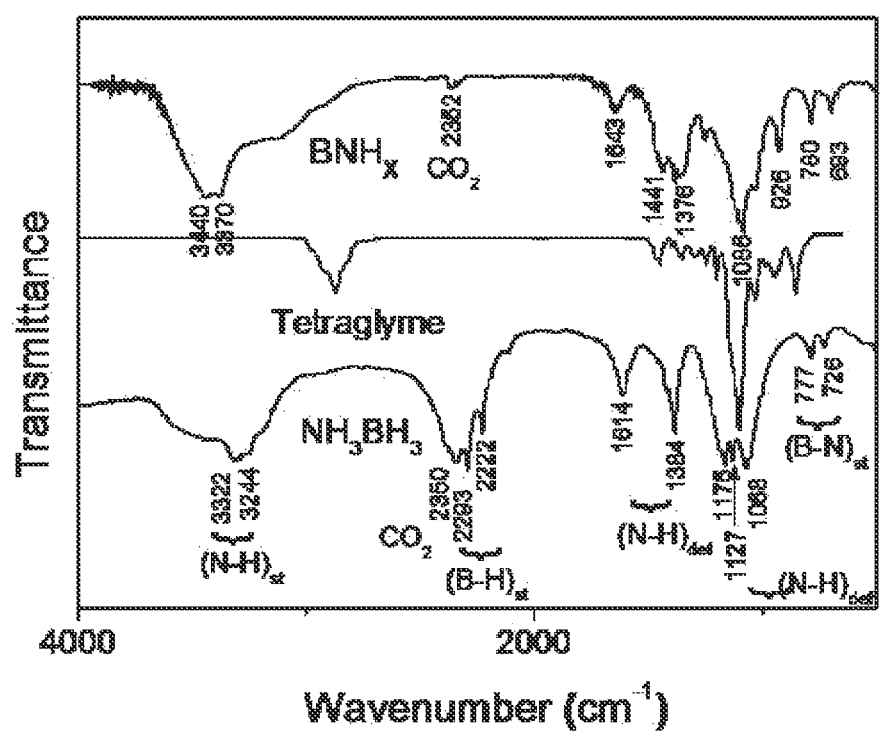
FIG. 5 shows an FT/IR spectrum of polyiminoborane ($BNH_x$) in an example of the present invention.

The generation amount of hydrogen was measured using a mass flow meter (MFM) (see FIG. 2). After drying the solvent, polyiminoborane in which the heterogeneous catalyst was dispersed could be obtained. The generated gas was subjected to quadrupole mass analysis. The gas was mostly hydrogen, with a trace amount of ammonia (see FIG. 3). After the generation of hydrogen was completed, the component dissolved in the solution was subjected to $^{11}$B-NMR measurement (The change of $^{11}$B-NMR peaks was measured with time). It was confirmed that ammonia borane was consumed completely (see FIG. 4). FIG. 4 shows the $^{11}$B-NMR peaks before injection of the catalyst (a), 30 seconds after the injection of the catalyst (b) and after completion of the reaction (c). When the component insoluble in the solvent was subjected to FT/IR measurement, all the boron hydrogen peaks of the ammonia borane disappeared (see FIG. 5).

INDUSTRIAL APPLICABILITY

Embodiments of the present invention provide an apparatus and a method for generating hydrogen from an ammonia borane-based compound as a hydrogen reservoir, a catalyst used in same and an apparatus for using the generated hydrogen.

The invention claimed is:

1. A method for generating hydrogen from a hydrogen reservoir, comprising releasing 2 equivalents of hydrogen from a total of 3 equivalents of hydrogen from ammonia borane or an ammonia borane derivative, which is a hydrogen reservoir, at room temperature within 1 minute by using a first catalyst in the presence of the hydrogen reservoir, wherein the first catalyst is a complex catalyst represented by Chemical Formula 1:

[Chemical Formula 1]

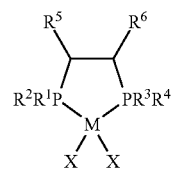

wherein M is Co; R$^1$, R$^2$, R$^3$ and R$^4$ are independently hydrogen, hydrocarbyl, substituted hydrocarbyl, heterohydrocarbyl or substituted heterohydrocarbyl; R$^5$ and R$^6$ are independently hydrocarbyl excluding hydrogen or substituted hydrocarbyl excluding hydrogen; and X is Cl.

2. The method according to claim 1, wherein the ammonia borane derivative is represented by the general formula R1NH$_2$BR2H$_2$, R3$_2$NHBR4H$_2$ or H$_2$R5BNH$_2$R6NH$_2$BR7H$_2$:

wherein R1, R2, R3, R4, R5, R6 and R7 are independently a hydrogen atom, a halogen atom, a C$_1$-C$_{20}$ linear or branched alkyl group substituted or unsubstituted with one or more halogen atom, a silyl group having a C$_1$-C$_{20}$ linear or branched alkyl group substituted or unsubstituted with one or more halogen atom, a C$_6$-C$_{30}$ aryl group substituted or unsubstituted with one or more halogen atom, a C$_7$-C$_{31}$ arylalkyl group substituted or unsubstituted with one or more halogen atom, an alkoxy group having a C$_1$-C$_{20}$ alkyl group substituted or unsubstituted with one or more halogen atom, a C$_3$-C$_{20}$ alkyl group or a C$_6$-C$_{20}$ aryl-substituted siloxy group, and these are optionally connected to form a ring.

* * * * *